United States Patent [19]

Estkowski et al.

[11] Patent Number: 5,230,571
[45] Date of Patent: Jul. 27, 1993

[54] CASTER BEARING ASSEMBLY

[75] Inventors: Michael H. Estkowski; Christopher G. Estkowski, both of St. Joseph, Mich.

[73] Assignee: Shepherd Products U.S., Inc., St. Joseph, Mich.

[21] Appl. No.: 983,507

[22] Filed: Nov. 30, 1992

[51] Int. Cl.⁵ ............... F16C 43/06; F16C 33/46; B60B 33/00
[52] U.S. Cl. ................... 384/560; 16/18 A; 29/898.061; 384/572
[58] Field of Search ............ 384/560, 565, 572, 523, 384/19; 16/18 A; 29/898.041, 898.061

[56] References Cited

U.S. PATENT DOCUMENTS

| | | |
|---|---|---|
| 760,264 | 5/1904 | Slick . |
| 978,161 | 12/1910 | Holmes . |
| 1,432,966 | 10/1922 | Chesnutt . |
| 2,073,066 | 3/1936 | Kalberer . |
| 3,141,711 | 7/1964 | Biedinger ............... 384/533 |
| 3,177,516 | 4/1965 | Price et al. . |
| 3,186,025 | 6/1965 | Kesterton . |
| 3,239,291 | 3/1966 | Batt ..................... 384/560 |
| 3,243,194 | 3/1966 | Trusock ............... 280/43.12 |
| 3,892,447 | 7/1975 | Gruber et al. . |
| 3,920,293 | 11/1975 | Takeuchi . |
| 3,991,434 | 11/1976 | James ................... 16/18 A |
| 4,069,543 | 1/1978 | James ................... 16/42 R |
| 4,432,659 | 2/1984 | Tuckey ................. 384/300 |
| 4,603,982 | 8/1986 | Dittrich ................ 384/129 |
| 4,706,329 | 11/1987 | Screen .................. 16/47 |
| 4,752,986 | 6/1988 | Rivkin et al. ......... 16/18 A |
| 4,783,182 | 11/1988 | Caron ................... 384/523 |
| 4,911,269 | 3/1990 | Perl ..................... 188/1.12 |
| 5,022,768 | 6/1991 | Baxter .................. 384/19 |
| 5,046,248 | 9/1991 | Lederman ............. 29/898.041 |
| 5,068,943 | 12/1991 | Estkowski et al. .... 16/18 A |

Primary Examiner—Thomas R. Hannon
Attorney, Agent, or Firm—Lee, Mann, Smith, McWilliams, Sweeney & Ohlson

[57] ABSTRACT

A bearing assembly comprising a roller mechanism and a cage member. The roller mechanism includes a plurality of roller members and a plurality of frangible connector links for initially connecting each roller member to an adjacent roller member. The roller members and the connector links are integrally molded together. The cage member includes a circular flange and a plurality of spacer pegs extending perpendicular from the flange in a circular configuration. The pegs are spaced apart from one another and each peg includes a tip having a hollow chamber adapted to receive and store a connector link. The pegs are adapted to be inserted between adjacent roller members during assembly such that when the cage member and the roller mechanism are pressed together, the pegs will sever the connector links from the roller members and will retain the severed connector links in the chambers of the peg tips. The severed roller members are then free to independently rotate within the cage member.

7 Claims, 1 Drawing Sheet 5,230,571

CASTER BEARING ASSEMBLY

BACKGROUND OF THE INVENTION

The present invention is directed to a bearing assembly having a plurality of roller members and a cage member, and in particular to a bearing assembly wherein the roller members are initially integrally connected to one another and held in place in a particular orientation and are subsequently disconnected by the cage member during assembly. Bearing assemblies have traditionally included a cage and a plurality of independent roller members. Each roller member was assembled in the cage one at a time and then the completed bearing assembly was installed. This assembly procedure requires a large amount of time. It is also difficult to retain the assembled bearing members in the cage and in the proper alignment as the remaining bearing members are assembled and as the completed bearing assembly is installed for use.

SUMMARY OF THE INVENTION

The present invention provides a bearing assembly comprising a roller mechanism and a cage member. The roller mechanism includes a plurality of roller members and a plurality of frangible connector links for initially connecting each roller member to an adjacent roller member and for holding the roller members in place in a circular configuration such that the roller members are spaced apart from one another. The roller members and the connector links are integrally molded together. The cage member includes a circular flange and a plurality of spacer pegs extending perpendicular from the flange arranged in a circular configuration. The pegs are spaced apart from one another and each peg has a tip which includes a hollow chamber adapted to receive, sever and store a connector link. The pegs are adapted to be inserted between adjacent roller members such that the connector links are located within the chambers in the pegs. When the cage member and the roller mechanism are pressed together during assembly, the pegs sever the connector links from the roller members. The pegs retain the severed connector links in the chambers in the tips of the pegs thereby allowing independent rotation of the roller members. The pegs then act as spacers to separate the roller members and hold them in proper orientation.

DETAILED DESCRIPTION OF THE INVENTION

Figure 1:
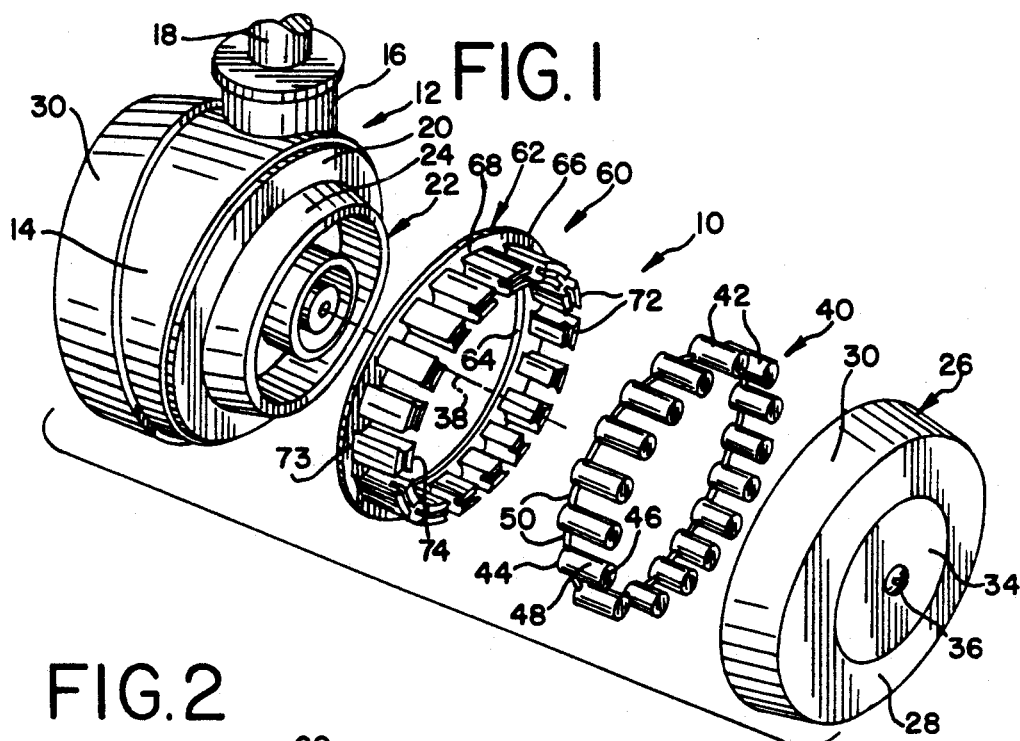
FIG. 1 is an exploded perspective view of the bearing assembly shown with a caster.

The bearing assembly 10 is shown in FIG. 1 with a caster 12 of the type more fully disclosed in U.S. Pat. No. 5,068,943 owned by Shepherd Products U.S., Inc. However, the bearing assembly 10 of the present invention may be used in various different types of devices and mechanisms where there is relative movement between adjacent parts. The caster 12 includes an integrally molded body 14 that can be made of plastic or other suitable materials. A socket 16 is adapted to receive a vertically disposed swivel stem 18 to secure the caster 12 to the underside of a chair leg, chair base or similar structure. Each side of the caster 12 is a mirror image of the other.

The body 14 is generally circular in configuration and defines a pair of inclined side walls 20. A cylindrical sleeve 22 extends outwardly from the side wall 20. The sleeve 22 defines an outer peripheral surface 24 which extends outwardly from the side wall 20. The peripheral surface 24 acts as an inner bearing race for the bearing assembly 10.

The caster 12 also includes a pair of wheels 26. Each wheel 26 defines an outer face 28 and an annular spherical surface in the form of a rim 30 extending inwardly from the outer face 28 to provide full contact with the surface upon which the caster 12 is rolled. The rim 30 includes an inner peripheral surface, not shown, which acts as an outer bearing race for the bearing assembly 10. Each wheel 26 is rotatably secured to the body 14 by a wheel cover 34 and a screw 36 for rotation about an axis 38.

Figure 2:
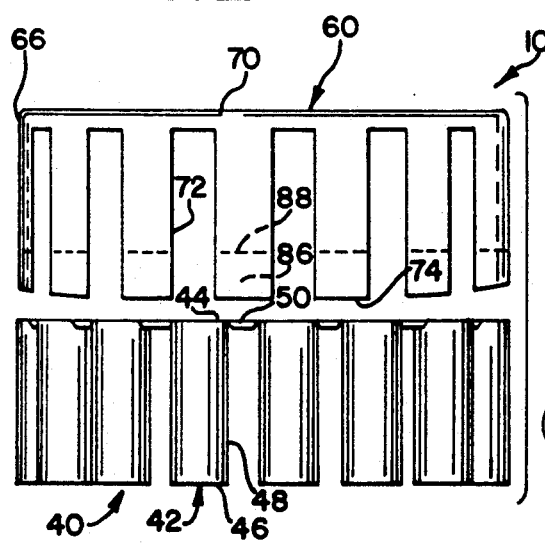
FIG. 2 is an exploded top view of the cage member and roller mechanism prior to assembly.

The bearing assembly 10 includes a roller mechanism 40. The roller mechanism 40 includes a plurality of individual roller members 42 each having a first end 44 and a second end 46. Each roller member 42 includes a peripheral surface 48 extending between the first end 44 and the second end 46. The configuration of the roller members 42 is shown in FIG. 2 as being cylindrical, however, the configuration may take on various other shapes and may be frusto-conical thereby forming tapered roller members.

Figure 4:
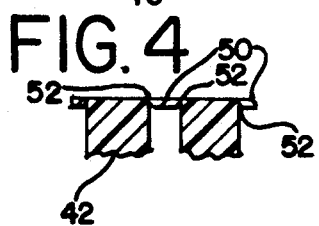
FIG. 4 is a partial cross sectional view of the roller mechanism.
Figure 5:
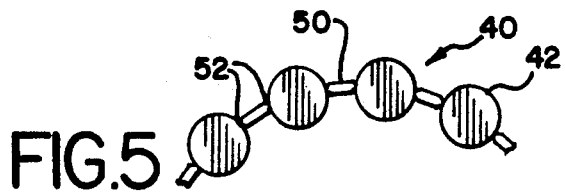
FIG. 5 is a partial side elevational view of the roller mechanism.

The roller mechanism 40 also includes a plurality of frangible links 50 which are integrally molded with the roller members 42. The roller members 42 and the links 50 are preferably made of a plastic material such as, for example, DELRIN or NYLON as manufactured by E. I. DuPont de Nemours & Co., Inc. Each link 50 extends between and connects two adjacent roller members 42, one to the other. As best shown in FIG. 4, the links 50 are formed as thin strips of plastic having a narrowed neck portion 52 at each end of the link 50 where the link 50 is attached to a roller member 42. The neck portions 52 facilitate the fracturing and severing of the links 50 to thereby disconnect the links 50 from the roller members 42.

As shown in FIGS. 1 and 4, the links 50 are preferably attached to the roller members 42 at the first end 44 of the roller members 42, but may be attached to the roller members 42 at other locations between the first end 44 and the second end 46 of the roller members 42. Additional links 50, not shown, may also be connected between adjacent roller members 42 such that two or more links 50 are connected and extend between two adjacent roller members 42.

The roller mechanism 40 may be initially molded such that the roller members 42 are arranged in a circular pattern as shown in FIG. 1, or the roller mechanism 40 may be molded such that the roller members 42 and their connecting links 50 extend in a straight line. When the roller mechanism 40 is molded in the linear format, the roller mechanism 40 may be bent to form the circular configuration of the roller mechanism 40 as shown in FIG. 1.

The bearing assembly 10 also includes a cage member 60. The cage member 60 includes an annular flange 62 having a circular inner rim 64, a circular outer rim 66, an inner planar and annular surface 68, and an outer planar and annular surface 70. The inner surface 68 and the outer surface 70 extend between the inner rim 64 and the outer rim 66. The inner rim 64 forms a circular aperture which extends through the flange 62. A plurality of spacer pegs 72 are integrally molded with the flange 62 and extend perpendicular and outwardly from the inner surface 68 of the flange 62. Each peg 72 includes a base 73 which is connected to the flange 62 and a tip 74 which is cantilevered outwardly from the base 73. The pegs 72 are arranged in a circular pattern and are spaced equidistantly from one another. The cage 60 is preferably made of a plastic material such as, for example, DELRIN or NYLON as manufactured by E. I. DuPont de Nemours & Co., Inc.

Figure 3:
FIG. 3 is an end view of the assembled bearing assembly.
Figure 3:
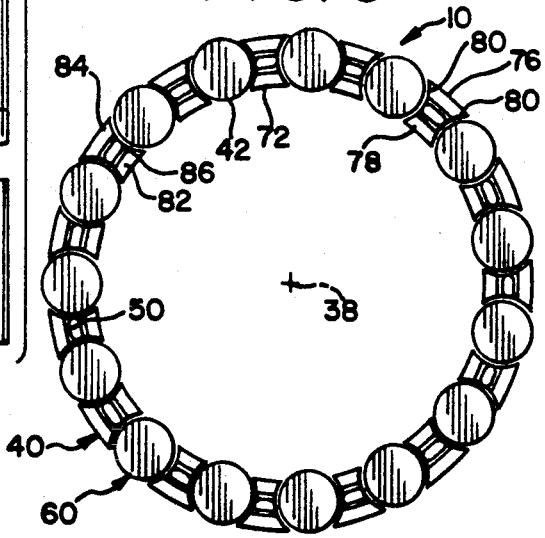

As best shown in FIG. 3, each peg 72 includes a convex outer wall 76, a concave inner wall 78 and a pair of opposing and oppositely facing concave side walls 80. Each side wall 80 extends between an end of the outer wall 76 and an end of the inner wall 78. The walls 76, 78 and 80 extend between the base 73 and the tip 74 of the pegs 72. As best shown in FIG. 3, the distance between the outer wall 76 and the inner wall 78 of the pegs 72 is less than the diameter of the roller members 42 as best shown in FIG. 3. As also shown in FIG. 3, the side walls 80 conform to an arc of a circle having a radius equal to, or slightly larger than, the radius of the peripheral surface 48 of the roller members 42. If tapered roller members 42 are used in the roller mechanism 40, the side walls 80 in the pegs 72 may also be tapered to correspond to the shape of the roller members 42.

The pegs 72 are arranged such that each roller member 42 in the roller mechanism 40 will fit respectively between two adjacent pegs 72 when the cage member 60 and the roller mechanism 40 are assembled. The pegs 72 are spaced apart from one another such that once the links 50 between adjacent roller members 42 are severed, the roller members 42 may freely rotate between the side walls 80 of the adjacent pegs 72 while the side walls 80 prevent the roller members 42 from moving radially inwardly or outwardly from the cage member 60.

The tip 74 of each peg 72 includes an inner flange 82 and an outer flange 84 formed by a slot extending between the side walls 80. The slot forms a hollow chamber 86 within the tip 74 of the peg 72. A bottom wall 88 is located at the bottom of the chamber 86. The flanges 82 and 84 of each peg 72 are spaced sufficiently far apart from one another such that the links 50 of the roller mechanism 42 fit between the flanges 82 and 84 and within the chamber 86. The bottom wall 88 and the chambers 86 are spaced at a distance sufficiently far from the flange 62 to ensure that the links 50 will come into contact with the bottom wall 88 of the chambers 86 before the roller mechanism 40 is fully inserted into the cage member 60.

In operation, the cage member 60 is placed around the inner bearing race 24 such that the flange 62 is adjacent a side wall 20 of the caster 12 and is concentric with the axis 38. The roller mechanism 40 is then assembled together with the cage member 60 by inserting the first end 44 of each roller member 42 respectively between the opposing side walls 80 of two adjacent pegs 72 such that the frangible links 50 are located within the hollow chambers 86 of the pegs 72. The roller mechanism 40 is then pressed further axially towards the flange 62 of the cage member 60 by the wheel 26 or any other suitable object. As the roller mechanism 40 is further inserted into the cage member 60, the bottom wall 88 of each peg 72 will fracture its corresponding link 50 at the neck portions 52 thereby severing and disconnecting the links 50 from the roller members 42. Alternatively, the second ends 46 of the roller members 42 may be placed against the side wall 20 of the caster 12, and the tips 74 of the pegs 72 of the cage member 60 may be inserted between the roller members 42 to similarly sever the links 50 from the roller members 42.

The roller members 42 are then further inserted into the cage member 60 and between the pegs 72 until the roller members 42 are located between the flange 62 and the tips 74 of the pegs 72. Each of the roller members 42 are then free to rotate about its longitudinal axis independently of one another and independently of the cage member 60. The severed roller members 42 are in contact with and rotate between the inner bearing race 24 of the caster body 14 and the outer bearing race of the wheel 26. The severed links 50 are retained in the hollow chambers 86 of the pegs 72 such that the severed links 50 will not interfere with the rotation of the roller members 42.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A bearing assembly comprising:
    a roller mechanism including a plurality of roller members and a plurality of frangible connector means for initially connecting each said roller member to an adjacent roller member and for holding said roller members in place separated from each other and preventing rotation of said roller members, said roller members and said connector means being integrally molded together; and
    a cage member including a flange and a plurality of spacer pegs, said pegs extending from said flange and being spaced apart from each other, each said peg having a tip including a hollow chamber adapted to receive and server said connector means during assembly and to store said severed connector means during operation, said pegs positioned so as to be locatable between adjacent roller members such that said connector means are received within said chambers, whereby the insertion of said pegs between said roller members during assembly severs said connector means from said roller members with said pegs retaining said severed connector means in said chambers during operation thereby allowing rotation of said roller members.

2. The bearing assembly of claim 1 wherein said roller members are arranged in a circular configuration.

3. The bearing assembly of claim 1 wherein said frangible connector means comprises a link attached at each end to a respective roller member.

4. The bearing assembly of claim 3 wherein said links include a narrowed neck portion at each end adjacent said attached roller member.

5. The bearing assembly of claim 1 wherein each said peg includes a first concave side wall and a second opposing and oppositely facing concave sidewall.

6. The bearing assembly of claim 5 wherein said hollow chamber is formed by a slot extending through said tip and said first and second concave side walls.

7. The bearing assembly of claim 6 wherein said tip of said pegs includes a first flange and a second flange spaced apart from said first flange.

* * * * *